(No Model.)

H. WILLIAMS.
DRAFT EQUALIZER.

No. 355,494. Patented Jan. 4, 1887.

WITNESSES:
John A. Ellis
C. Sedgwick

INVENTOR:
H. Williams
BY Munn & Co.
ATTORNEYS.

UNITED STATES PATENT OFFICE.

HENRY WILLIAMS, OF DOYLESTOWN, OHIO.

DRAFT-EQUALIZER.

SPECIFICATION forming part of Letters Patent No. 355,494, dated January 4, 1887.

Application filed October 14, 1886. Serial No. 216,235. (No model.)

*To all whom it may concern:*

Be it known that I, HENRY WILLIAMS, of Doylestown, in the county of Wayne and State of Ohio, have invented a new and Improved Draft-Equalizer, of which the following is a full, clear, and exact description.

This invention relates to draft equalizing devices, the object of the invention being to provide for an equal distribution of the power of three horses, and at the same time to provide for the use of but two horses, in case the full number for which the equalizer is designed should not be needed to advance the machine or vehicle in connection with which the equalizer is arranged.

Reference is to be had to the accompanying drawings, forming a part of this specification, in which similar figures of reference indicate corresponding parts in both the views.

Figure 1:
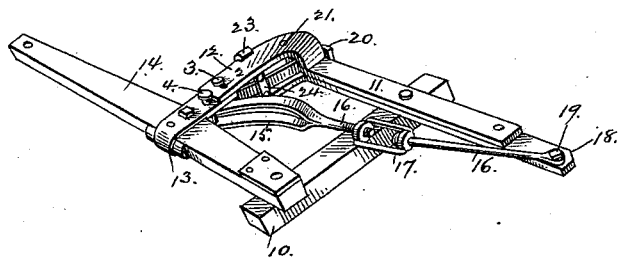
Figure 2:
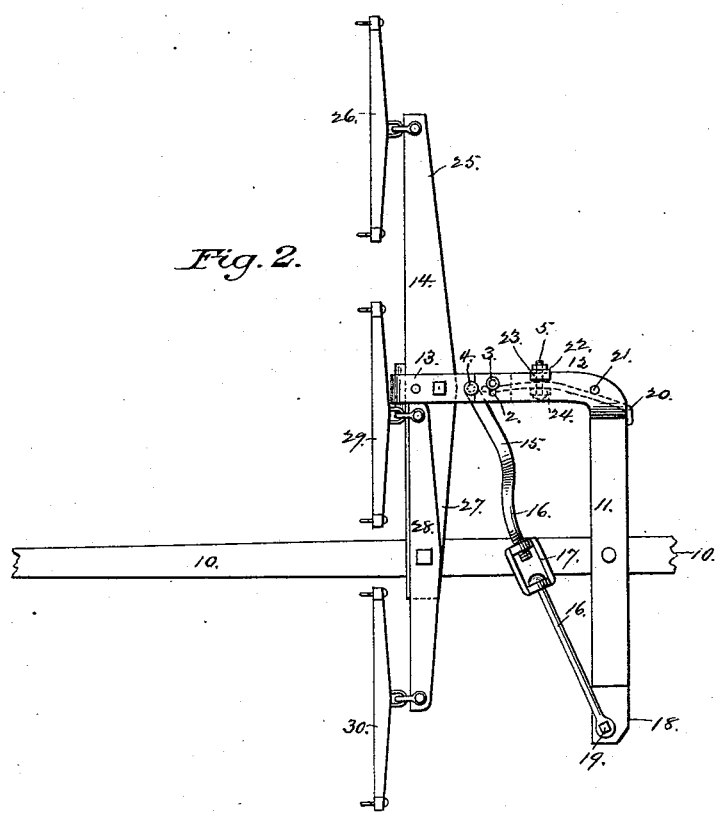

Figure 1 is a perspective view of my improved form of draft-equalizer, the single and double trees arranged in connection therewith being removed, and a portion only of the pole being shown. Fig. 2 is a plan view of the equalizer, the single and double trees being represented as in place.

In the drawings above referred to, 10 represents the pole of the vehicle or machine in connection with which the equalizer is to be employed. To this pole there is secured a lever, 11, which is preferably made of two rigidly-connected strips, said strips being bent apart and forward at one end, so as to form a jaw, 12, each arm of said jaw being provided with an elongated cross-slot, as 2.

The shackle 13 of the king-tree 14 is held between the arms of the jaw 12 by a bolt, 3, which passes through properly-formed apertures in the shackle and through the elongated slots 2 of the jaw, the two lengths of the shackle extending somewhat to the rear beyond the bolt 3. The shackle 13 carries a second bolt, 4, that is engaged by the bifurcated end 15 of a stay-rod, 16, said stay-rod being provided with a turn-buckle, 17, and being secured to the extending end 18 of the lever 11 by a bolt, 19.

A spring, 20, is arranged so as to pass inward and forward between the arms of the jaw 12, the end of the spring being bent over to bear against the rear edge of the lever, passing thence by a bolt or pin, 21, and through a clamp, 22, said clamp consisting of an outer clip, 23, which bears against the outer edge of the jaw, and an inner clip, 24, which bears against the spring, the two clips being united by bolts 5. The forward end of the spring bears against that side of the bolt 3 that is toward the pole 10, the action of the spring being to hold the shackle, and consequently the king-tree 14, in the position in which the parts are shown in Fig. 2.

To the longer arm, 25, of the king-tree 14 there is secured a single-tree, 26, while to the shorter arm, 27, of said king-tree there is secured a double-tree, 28, which carries two single-trees, 29 and 30. The horses are hitched to the single-trees, and from the peculiar arrangement of the parts described it will be seen that the draft of the horses will be in a line parallel with the center of the pole, the spring 20 acting to return the parts to their normal position should any undue power be exerted by the horses attached to the double-tree 28.

The proper adjustment of the king-tree may be secured by turning the turn-buckle 17 of the stay-rod 16.

Having thus fully described my invention, I claim as new and desire to secure by Letters Patent—

1. In a draft-equalizer, the combination, with a lever connected to the pole and formed with a jaw having elongated cross-slots 2, of a king-tree held by a bolt which passes through said elongated slots, and by a second bolt which engages with the end of a stay-rod that is secured to the opposite end of the lever, substantially as described.

2. In a draft-equalizer, the combination, with a lever connected to the pole and formed with a jaw having elongated cross-slots 2, of a king-tree held by a bolt which passes through said elongated slots, and by a second bolt which engages with the end of a stay-rod that is secured to the opposite end of the lever, a turn-buckle being arranged in connection with the stay-rod, substantially as described.

3. In a draft-equalizer, the combination, with a lever secured to the pole and formed with a jaw, 12, of a king-tree having a shackle, 13, a bolt, 3, passing through elongated cross-slots formed in the jaw of the lever and through apertures formed in the shackle, a spring, 20, mounted within the jaw and arranged to bear against the bolt 3, and a stay-rod, 16, having a turn-buckle, 17, said stay-rod being connected to a bolt carried by the shackle of the king-tree and to the extending end of the lever, substantially as described.

4. In a draft-equalizer, the combination, with a lever connected to the pole and formed with a jaw, 12, of a king-tree and its shackle, a bolt, 3, passing through elongated slots formed in the arms of the jaw of the lever and through apertures formed in the shackle, a spring, 20, mounted within the jaw and bearing against the bolt 3, a clamp, 22, and a pin or bolt, 21, a stay-rod, 16, connected to the lever, and a bolt, 4, arranged in connection with the shackle, and to which the forward end of the stay-rod is connected, substantially as described.

HENRY WILLIAMS.

Witnesses:
W. A. HOFFMAN,
W. H. SMITH.